US011244363B1

(12) United States Patent
Garrity et al.

(10) Patent No.: US 11,244,363 B1
(45) Date of Patent: Feb. 8, 2022

(54) RATING AND REVIEW INTEGRATION SYSTEM

(71) Applicant: Sprinklr, Inc., New York, NY (US)

(72) Inventors: Justin Trevor Garrity, Portland, OR (US); Dan Blaisdell, Hillsboro, OR (US); Ryan Robert Parr, North Plains, OR (US)

(73) Assignee: SPRINKLR, INC.

( * ) Notice: Subject to any disclaimer, the term of this patent is extended or adjusted under 35 U.S.C. 154(b) by 203 days.

(21) Appl. No.: 16/596,189

(22) Filed: Oct. 8, 2019

Related U.S. Application Data

(63) Continuation-in-part of application No. 16/447,138, filed on Jun. 20, 2019.

(60) Provisional application No. 62/750,762, filed on Oct. 25, 2018.

(51) Int. Cl.
| | |
|---|---|
| *G06F 16/00* | (2019.01) |
| *G06Q 30/02* | (2012.01) |
| *G06F 16/2457* | (2019.01) |
| *G06F 16/9536* | (2019.01) |
| *G06F 40/53* | (2020.01) |

(52) U.S. Cl.
CPC ... *G06Q 30/0282* (2013.01); *G06F 16/24578* (2019.01); *G06F 16/9536* (2019.01); *G06F 40/53* (2020.01)

(58) Field of Classification Search
CPC .......... G06F 16/9536; G06F 16/24578; G06F 40/53; G06Q 30/0282
See application file for complete search history.

(56) References Cited

U.S. PATENT DOCUMENTS

| | | | |
|---|---|---|---|
| 7,406,436 B1 * | 7/2008 | Reisman | G06Q 30/02 705/7.32 |
| 8,655,938 B1 | 2/2014 | Smith | |
| 8,972,275 B2 | 3/2015 | Park et al. | |
| 9,201,955 B1 | 12/2015 | Quintao | |
| 9,218,610 B2 | 12/2015 | Kandregula | |
| 10,467,630 B2 | 11/2019 | Iyer et al. | |
| 10,684,738 B1 * | 6/2020 | Sicora | G06F 16/435 |
| 10,769,223 B1 * | 9/2020 | Patel | G06F 16/9535 |
| 2001/0028369 A1 | 10/2001 | Gallo | |

(Continued)

FOREIGN PATENT DOCUMENTS

WO  WO 2016/118425 A1  7/2016

OTHER PUBLICATIONS

McIntyre et al., Support for Multitaking and Background Awareness Using Interactive Peripheral Displays, ACM 2001, pp. 41-50 (2001).

(Continued)

*Primary Examiner* — Jared M Bibbee
(74) *Attorney, Agent, or Firm* — Schwabe Williamson & Wyatt

(57) ABSTRACT

Some embodiments may include a rating system to generate a structured rating value from aggregated content generated using disparate computer data processing systems, wherein the aggregated content includes structured content from a first computer data processing system of the disparate computer data processing systems and unstructured content from a second different computer data processing system of the disparate computer data processing systems. Other embodiments may be disclosed and/or claimed.

20 Claims, 5 Drawing Sheets

(56) References Cited

U.S. PATENT DOCUMENTS

| | | |
|---|---|---|
| 2003/0187956 A1 | 10/2003 | Belt |
| 2003/0220835 A1 | 11/2003 | Barnes, Jr. |
| 2004/0054819 A1 | 3/2004 | Daimoto et al. |
| 2005/0050021 A1 | 3/2005 | Timmons |
| 2005/0131909 A1 | 6/2005 | Cavagnaro et al. |
| 2006/0184963 A1 | 8/2006 | Snijder |
| 2007/0103583 A1 | 5/2007 | Burnett |
| 2008/0284910 A1 | 11/2008 | Erskine |
| 2010/0119053 A1* | 5/2010 | Goeldi ............... G06Q 30/0251 379/265.09 |
| 2011/0004827 A1 | 1/2011 | Doerr |
| 2011/0098108 A1 | 4/2011 | Kuper |
| 2011/0122155 A1 | 5/2011 | Zechlin |
| 2011/0255748 A1 | 10/2011 | Komoto |
| 2011/0307312 A1* | 12/2011 | Goeldi ............... G06Q 30/0251 705/14.6 |
| 2011/0320948 A1 | 12/2011 | Choi |
| 2012/0110427 A1 | 5/2012 | Krause |
| 2012/0134536 A1 | 5/2012 | Myokan |
| 2012/0291059 A1 | 11/2012 | Roberts |
| 2013/0014137 A1* | 1/2013 | Bhatia ............... G06Q 30/0201 725/9 |
| 2013/0124653 A1* | 5/2013 | Vick ....................... H04L 51/32 709/206 |
| 2013/0166379 A1 | 6/2013 | Ehindero |
| 2013/0297581 A1 | 11/2013 | Ghosh |
| 2013/0297694 A1 | 11/2013 | Ghosh |
| 2014/0040029 A1 | 2/2014 | Vhora |
| 2014/0143333 A1* | 5/2014 | Dodge .................. G06Q 50/01 709/204 |
| 2014/0156341 A1 | 6/2014 | Kruk |
| 2014/0172744 A1* | 6/2014 | El-Hmayssi ....... G06Q 30/0282 705/347 |
| 2014/0180788 A1* | 6/2014 | George ............. G06Q 30/0277 705/14.41 |
| 2014/0214819 A1* | 7/2014 | Aitchison ............... G06F 16/29 707/724 |
| 2014/0222578 A1 | 8/2014 | Poornachandran |
| 2014/0232616 A1 | 8/2014 | Drake |
| 2014/0280052 A1 | 9/2014 | Alonzo et al. |
| 2014/0358630 A1* | 12/2014 | Bhagat ............... G06Q 30/0201 705/7.29 |
| 2014/0361954 A1 | 12/2014 | Epstein |
| 2015/0012353 A1* | 1/2015 | Ciancio-Bunch ........................... G06Q 30/0269 705/14.49 |
| 2015/0019335 A1 | 1/2015 | Zhou |
| 2015/0031389 A1 | 1/2015 | Liu |
| 2015/0046269 A1 | 2/2015 | Liu |
| 2015/0046781 A1 | 2/2015 | Baker |
| 2015/0067075 A1 | 3/2015 | Sheppard et al. |
| 2015/0088622 A1 | 3/2015 | Ganschow |
| 2015/0089429 A1 | 3/2015 | Ghassabian |
| 2015/0100377 A1* | 4/2015 | Penumaka ............. G06Q 50/01 705/7.29 |
| 2015/0112814 A1 | 4/2015 | Stokes |
| 2015/0161633 A1 | 6/2015 | Adams |
| 2015/0163311 A1* | 6/2015 | Heath ................ G06Q 30/0236 709/204 |
| 2015/0186929 A1* | 7/2015 | Thies ................. G06Q 30/0267 705/14.45 |
| 2015/0187333 A1 | 7/2015 | Loeffler |
| 2015/0213119 A1 | 7/2015 | Agarwal |
| 2015/0235239 A1 | 8/2015 | Chowdhary |
| 2015/0279037 A1 | 10/2015 | Griffin |
| 2016/0019397 A1* | 1/2016 | Peterson ............... G06F 16/955 726/28 |
| 2016/0088362 A1 | 3/2016 | Kaneko et al. |
| 2016/0140627 A1 | 5/2016 | Moreau |
| 2016/0155389 A1 | 6/2016 | Beon |
| 2016/0188661 A1 | 6/2016 | Huang et al. |
| 2016/0217408 A1* | 7/2016 | Garrity ............... G06Q 10/063 |
| 2016/0225017 A1 | 8/2016 | Wong |
| 2016/0321696 A1* | 11/2016 | Murthy ............. G06Q 30/0257 |
| 2016/0343040 A1* | 11/2016 | Garrity ................. G06Q 50/01 |
| 2017/0061469 A1* | 3/2017 | Garrity ................. G06Q 50/01 |
| 2017/0084246 A1 | 3/2017 | Joshi |
| 2017/0206557 A1 | 7/2017 | Abrol et al. |
| 2017/0357217 A1* | 12/2017 | Raymann ............ G06F 3/04847 |
| 2017/0372429 A1 | 12/2017 | La Placa |
| 2018/0024712 A1* | 1/2018 | Sievers ................ G06F 3/0481 715/738 |
| 2018/0260185 A1 | 9/2018 | Garrity |
| 2019/0026786 A1* | 1/2019 | Khoury ............. G06Q 30/0271 |
| 2019/0026788 A1 | 1/2019 | Garrity |
| 2019/0065610 A1* | 2/2019 | Singh ...................... H04L 51/32 |
| 2019/0087874 A1* | 3/2019 | DeLuca ............. G06Q 30/0282 |
| 2019/0094027 A1 | 3/2019 | Xu |
| 2019/0102075 A1 | 4/2019 | Naidoo |
| 2019/0173826 A1* | 6/2019 | DeLuca ................. H04L 51/32 |
| 2019/0205839 A1* | 7/2019 | Dotan-Cohen ..... G06Q 10/1093 |
| 2019/0206231 A1* | 7/2019 | Armstrong ............ H04W 4/029 |
| 2019/0230473 A1* | 7/2019 | Raji ......................... G01S 5/00 |
| 2019/0265942 A1 | 8/2019 | Yoshimura |
| 2019/0333118 A1* | 10/2019 | Crimmins ........... G10L 15/1815 |
| 2020/0177722 A1* | 6/2020 | Janugani ............. H04N 21/478 |
| 2020/0226526 A1 | 7/2020 | Garrity |
| 2020/0250395 A1 | 8/2020 | Ross |
| 2020/0273063 A1 | 8/2020 | Garrity et al. |
| 2020/0293258 A1 | 9/2020 | Lin |
| 2020/0387411 A1* | 12/2020 | Chu .................... G06F 16/5866 |
| 2020/0401640 A1 | 12/2020 | Garrity |
| 2021/0295233 A1 | 9/2021 | Garrity et al. |

OTHER PUBLICATIONS

Krishnaprasad et al., "JuxtaView—A Tool for Interactive Visualization of Large Imagery on Scalable Tiled Displays", IEEE 2004, pp. 411-420 (2004).

Yamaoka et al., Visualization of High-Resolution Image Collections on Large Tiled Display Wall, Elsevier 2011, pp. 498-505 (2011).

Gruhl, et al., "Multimodal social intelligence in a real-time dashboard system", VLDB Journal 19.6: 825-848; Springer New York; Jan. 1, 2010.

Guille et al. "SONDY: An open source platform for social dynamics mining and analysis" Proceedings of the ACM SIGMOD International Conference on Management of Data: 1005-1008. Association for Computing Machinery. (Jul. 30, 2013).

Henderson, Harry: "Encyclopedia of Computer Science and Technology" Nov. 1, 2008, Facts on File; 580 pages.

International Search Report and Written Opinion from the International Searching Authority for PCT/US2016/013680 dated Mar. 22, 2016; 12 pages.

Psaltis, Andrew G.; "Streaming Data Designing the Real-Time Pipeline" Jan. 16, 2015, Manning Publications; 12 pages.

Tanenbaum, Andrew S., et al.; "Distributed Systems: Principles and Paradigms (2nd Edition)" Prentice Hall; Oct. 12, 2006; 68 pages.

Trendsmap Announces First Real-Time Geographic Visualization for Twitter Trends Tracking Business Wire Sep. 22, 2009: NA.

Wikipedia: "Server (computing)", Internet Article Jan. 19, 2015; retrieved from the internet: <URL: https://en.wikipedia.org/w/index.php?title=Server_(computing)&oldid=643171056> retrieved on Mar. 14, 2016; 7 pages.

Paek et al., "A Multimethod Approach to Evaluating Social Media Campaign Effectiveness", pp. 1570-1579 (2013).

\* cited by examiner

RATING AND REVIEW INTEGRATION SYSTEM

RELATED APPLICATIONS

This application is a non-provisional of and claims priority benefit to U.S. Provisional Application Ser. No. 62/750,762, filed Oct. 25, 2018, and this application is a continuation-in-part of U.S. patent application Ser. No. 16/447,138, filed Jun. 20, 2019, each of which is incorporated by reference herein in its entirety.

BACKGROUND

Users go to a product website and rate the product by entering a discrete number, number of stars, thumbs up, like, etc. Users also may post text reviews on the product website and engage with posts by other users by commenting, indicating that they like the post, or rebroadcasting the post to their friends and followers. However, only a relatively small group of consumers may actually rate and review products on the product webpage.

These ratings and reviews can create a massive text-based section of a product detail webpage. This large block or reviews essentially takes over and disrupts the flow of the brand. Social media content can be added to a product webpage, but it is embedded in different sections of the webpage separating reactions on social media for a product from the ratings and reviews for the product.

Fans of a product may leave unstructured reviews on different social media networks, such as Instagram® and Twitter®. For example, when a consumer likes a product, they may post a photo of the product on Instagram®. If the consumer has a thought regarding the product, they may post a Tweet regarding the product on Twitter®. However, only a small number of these social media reviews ever show up on the product webpage. Thus, many consumers may not see much of the social media associated with a product prior to making a purchase.

DETAILED DESCRIPTION

Users may rate objects such as events, goods and/or services (e.g., products such as physical items or access to and/or copies of digital content such as video, music, games, etc.), or the like. The ratings are typically based on a scale and are usually provided by participants of the events, users of the goods and services (e.g., buyers of a product), etc. Reviews are usually provided in text form and may include photos or videos. The ratings and reviews may be managed by an official source, such as the host of the event or a source of the goods and/or services. Product reviews, for instance, may be displayed on a product webpage or on a comparison page on the provider website.

An official website for the events, services, or goods, such as a website operated by the source of the goods and/or services, may only show a limited portion of the rating and reviews for the product. The additional ratings and reviews may be in the form of unstructured content posted on social networks. For example, a user may post a message saying they love a particular car, post a picture of them in the car, and post a number of icons, such as a thumbs up, hearts, stars, or fire emojis, indicating how much then like the car.

Users may post different types of product reviews on different social networks. For example, due to the relative short text restrictions on Twitter®, some users may be more likely to post relatively short text messages on Twitter® that review or rate a product. Users on Instagram® may post fewer text messages rating or reviewing products, but may post more pictures of themselves using products they like. A user posting a picture of themselves with a product may represent a strong positive impression of that product. In another example, a user generating a video reviewing a product may be more trustworthy to other consumers than a single numerical rating and a short one-sentence text review.

A rating and review (RR) system combines structured product ratings and reviews from one system with unstructured ratings and reviews from other systems such as different social, company, and third-party networks. The RR system may insert the integrated RR data into a product webpage or any other display device, and add additional photos, videos, and/or pull quotes associated with the same product.

The RR system may calculate an average overall rating from the structured and unstructured content and curate the best social posts and reviews for a product from a larger pool of social media sources. The integrated rating and review content provides a more compelling user experience and provides greater brand value by displaying a wider variety of customer feedback that amplifies social media beyond the single websites most product ratings and reviews are trapped in.

Figure 1:
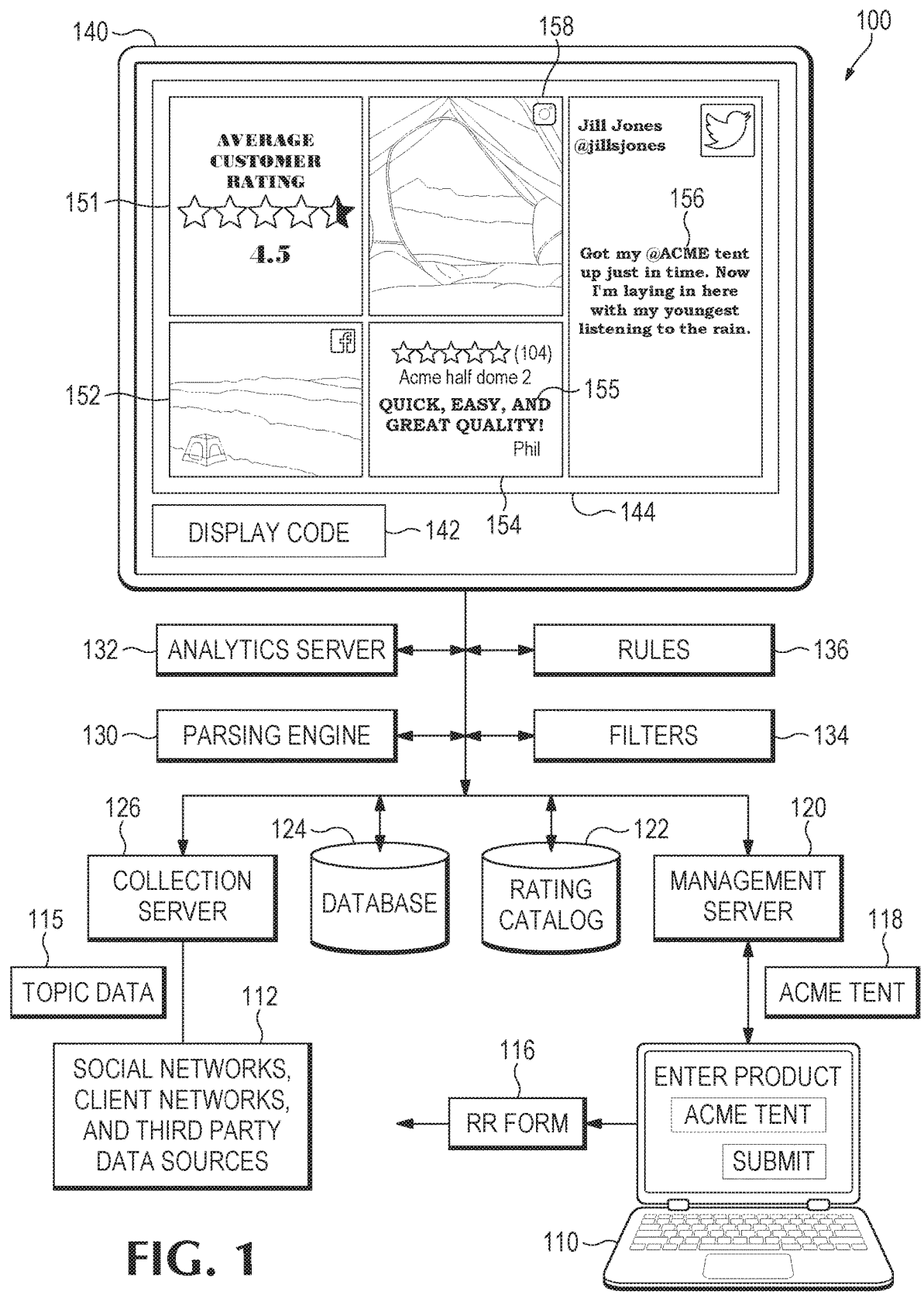
FIG. 1 depicts an example rating and review integration system.

FIG. 1 shows a rating and review integration system (RR system) 100. RR system 100 may access data from different data sources 112, such as social networks, company networks, and third-party websites. Social networks 112 may include websites, such as Twitter®, Facebook®, Instagram®, YouTube®, or the like.

Client networks 112 may include websites for a company, individual, or other entity. For example, client networks 112 may include the www.acme.com website and other Acme company databases. In one example, client networks 112 may operate software applications, such as those provided by Bazaarvoice® and PowerReviews® that generate structured ratings for associated products.

Third party data sources 112 may include data on websites such as Adobe® or Google® analytics that monitor, measure, and generate metrics for other data sources or websites. Another example third party data source may include customized databases, such as created by Salesforce®, Salesforce® Radian6, or Sysomos® that provides access to marketing and sales data.

Some networks 112 may provide structured ratings and reviews of products, such as with numerical values, stars, or other values selectable within a rating system. For example, a user may access the Acme website and navigate to a webpage that displays a tent. The webpage includes rating software that allows users to select between different icons, such as stars or numbers, each associated with a different rating level.

Typically, a first lowest or furthest positioned icon may be associated with a lowest rating, and a second highest or opposite positioned icon may be associated with a highest rating. The rating software captures the user rating and any associated user comments. The rating software then generates an overall rating for the product from the individual ratings and organizes and displays the overall and individual ratings and reviews on the product webpage.

Other networks 112 may allow users to post unstructured ratings and reviews, such as posted text messages that indicate what a user thinks of a particular event, service, product, or topic. For example, a user may post a text message that includes with the following adhoc product rating:

"The new Acme tent is fantastic, 5 stars."

The text message uses unstructured text to indicate a 5-star rating for the product.

In another example, a user may provide an unstructured adhoc product rating using digital images or icons, such as emojis. For example, a user may post the following message:

"The Acme tent rocks! ♥ ♥ ♥ ♥ ♥ ♥ ♥ ♥ ♥"

The multiple heart icons are unstructured since they are not part a defined software rating system. However, the text message in combination with the multiple heart icons appear to indicate that the user has given the Acme tent product a highest rating, typically associated with 5 stars.

In some examples, the different data sources 112 may be controlled by different entities and/or designed for different purposes (e.g., video sharing vs. structured product reviews), and are "different" in one or more of these respects. In other cases, at least some of the data sources 112 may be from disparate systems—isolated in operation from one another. A disparate system may include a computer data processing system that was designed to operate as a fundamentally distinct data processing system without exchanging or interacting with other computer data processing systems. Software applications such as those that generated structured ratings for associated products and social media in which users provide ad hoc ratings and reviews of products in unstructured data fields are examples of disparate systems.

A computer 110, such as a laptop, personal computer, notebook, or smart device, identifies what data to extract from data sources 112. For example, an operator may enter a keyword, data string, term, or any other combination of characters into computer 110 associated with a particular subject, data category, content, product, service, event, label, hashtag, etc., referred to generally below as a topic 118.

For example, topic 118 may comprise the name of company or person, a name of a product or service, a brand name, a name for a campaign or event associated with a company or person, a name of a department within a company, a name of an account on a social website, a name of a subject or account, a hashtag associated with the person or company, a name of a competitor or competitive product, etc.

In addition to identifying topic 118, an operator may identify via computer 110 which networks 112 to use for extracting topic data 115. For example, the operator may identify the Acme.com website, Twitter®, YouTube®, Facebook®, and Instagram®.

The operator may submit topic 118 to a management server 120. Management server 120 then directs collection server 126 to extract data 115 from selected data sources 112 associated with topic 118. Management server 120 also may direct an analytics engine 132 to connect to data sources 112 and access any other streaming data associated with topic 118.

Collection server 126 may use application programmer interfaces (APIs) to extract data 115 associated with topic 118 from data sources 112. These APIs may enable the collection server 126 to accumulate content from disparate systems. For example, collection server 126 may use APIs to extract posts from social networks that discuss topic 118 or that contain pictures or videos associated with topic 118. Collection server 126 also may extract structured data from data sources 112, such as the customer ratings submitted on the Acme.com website associated with topic 118. Topic data 115 from all of the different data sources 112 is stored in a database 124 for processing by other components of the RR system 100, such as the analytics server 132 and/or the parsing engine 130.

Analytics server 132 may extract and/or generate different metrics from topic data 115. For example, analytics server 132 may identify impressions, likes, or any other metrics that may be used as part of the rating and review of topic 118.

Analytics server 132 may download messages sent by different celebrities, messages sent by different journalists, and images sent by any variety of different users. Analytics engine 132 may accumulate all web traffic associated with topic 118 and generate graphs that identify the number of messages generated for the keywords 118 for different time periods, such as every 30 minutes or every hour.

The operator of computer 110, such as an employee of Acme, may create rules 136 that determine which sources 112 to extract data, which data 115 to extract from sources 112, what types of unstructured ratings and reviews in topic data 115 to use for converting into structured ratings, and what data, ratings, and reviews to combine together and display for topic 118.

Rules 136 also may direct RR system 100 to display pictures associated with topic 118 with the rating and review data that was posted within the last 30 days and/or that has a certain number of views, likes, engagement, etc.

A parsing engine 130 parses topic data 115 for structured or unstructured ratings or reviews of topic 118. For example, parsing engine 130 parses topic data 115 from the Acme.com website to identify structured customer ratings with 1-5 stars for the Acme tent.

Parsing engine 130 also parses topic data 115 for adhoc unstructured rating associated with topic 118. For example, the operator may identify a set of icons and/or emojis in rules 136 associated with ratings. For example, the operator may list icons such as stars, thumbs up, fire, happy faces, etc. The operator also may list icons into rules 136 associated with negative ratings such as a thumps down, sad faces, stinky objects, etc. The operator also may enter different text phases into rules 136 associated with different ratings, such as: best, worst, good, average, 5 stars, a/b/c/d/f grades, etc.

Parsing engine 130 then parses data 115 for any of the selected icons and/or text phrases and stores the unstructured ratings for topic 118, along with any structured ratings for topic 118, in a rating catalog database 122.

Parsing engine 130 then converts all of the different structured and unstructured ratings based on rules 136 into a set of normalized structured ratings. For example, rules 136 may direct parsing engine 130 to assign any unstructured rating content 127 that contains 5 or more positive icons a structured rating of 5.

As mentioned above, some icons may be associated with negative ratings. Rules 136 may direct parsing engine 130 to assign lower normalized ratings when more negative icons are detected. For example, one "thumbs down" icon may be assigned a 2 rating and three or more "thumbs down" icons may be assigned a lowest zero rating.

Another rule 136 may assign rating values to different adjectives and exclamatory phrases. For example, a word such as "best" may be assigned a 5 rating, a word such as "good" may be assigned a 3 rating, and a word such as "terrible" may be assigned a 0 rating.

Parsing engine 130 may average all of the normalized ratings from the structured and unstructured data to generate an overall average customer rating 151.

Figure 2:
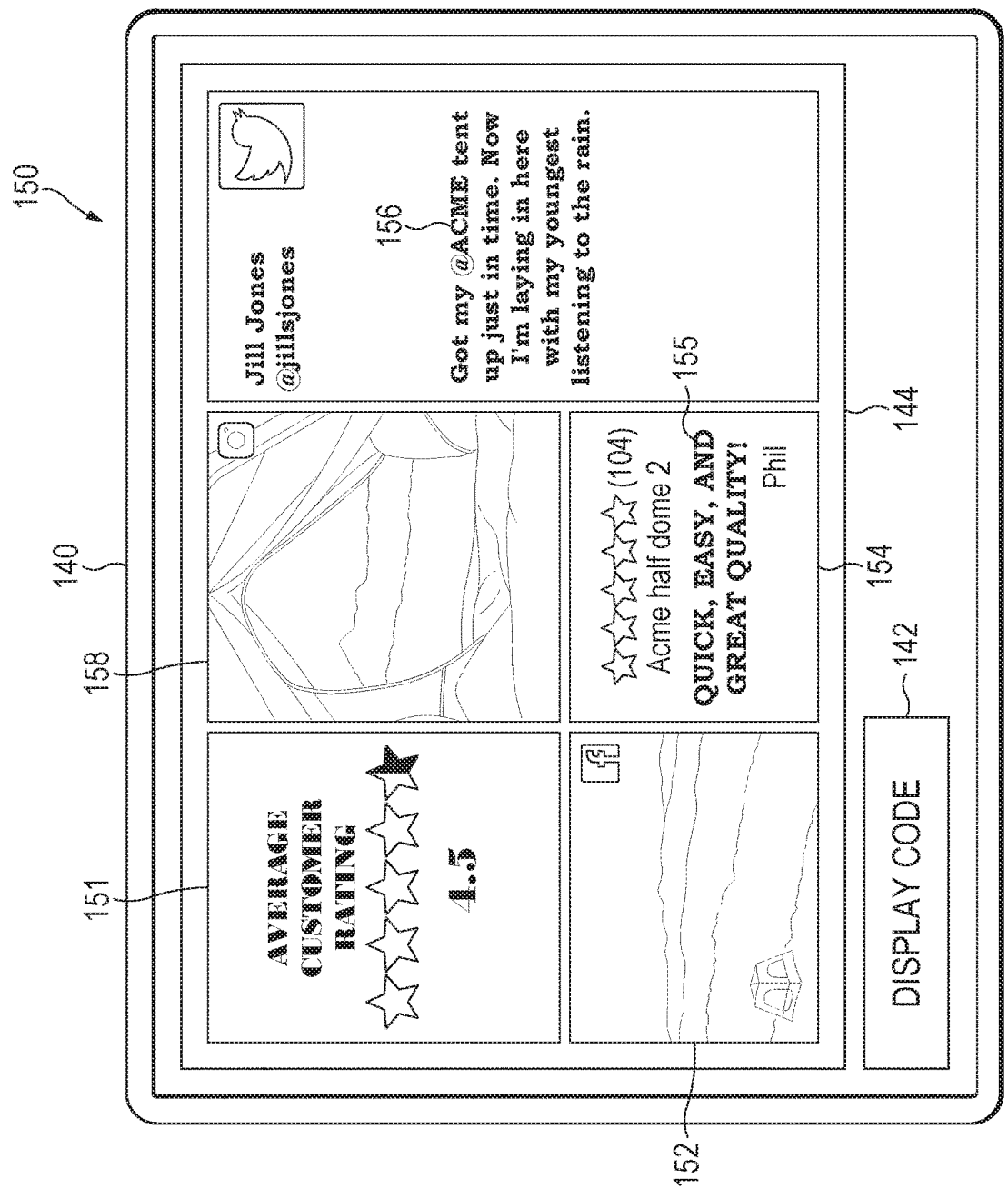
FIG. 2 depicts in more detail integrated rating and review data.

Referring to FIGS. 1 and 2, display code 142 may be loaded on a website or webpage 144 or on a computer device 140. Display code 142 displays different rating and review content 150 associated with topic 118. For example, display code 142 may be HTML code embedded in the Acme.com website.

Display code 142 may display average customer rating 151 and display other images and content associated with topic 118. For example, display code 142 may display an image 152 of the Acme tent posted on Facebook® and display an image 158 of the Acme tent posted on Instagram®. In another example, display code 142 may display a YouTube® video showing a user using the Acme tent.

Display code 142 also may display an exemplary structured rating 154 obtained from the Acme.com website. Display code 142 also may display a pull quote 155 from the review provided with rating 154. Display code 142 also may display a text message 156 posted on the Twitter® website regarding the topic 118.

As mentioned above, users on different websites 112 may post different types of content. For example, users on Facebook® and Instagram® may post more pictures and less text, where users on Twitter® may post more text reviews and fewer pictures. RR system 100 extracts a variety of different content, ratings, and reviews associated with topic 118 from all of the different websites 112. Display code 142 then combines and displays the different ratings, reviews, and other content into a same area on webpage 144.

Shoppers on the Acme website may select different filters 134 that determine what content is displayed on webpage 144. For example, a customer may select filters 134 that direct RR system 100 to show the top ratings and reviews from Twitter® and show pictures from Instagram®, etc.

RR system 100 also may provide a rating and review form 116 that allows users to post structured reviews on nonstructured social networks 112. For example, form 116 may allow a user to enter and post 5 selectable icons on the Twitter® website to assign a 1-5 rating to a selectable topic.

Displaying together different ratings, reviews, and content from multiple different social networks, client networks, and third-party networks 112 provides a more democratic and visual overview of a topic and gives consumers a better sense of how the general public feels about the topic. For example, displaying an Instagram® image of a customer using their tent in the forest or displaying a YouTube® video of a person assembling and testing their tent may have more influence on a potential buyer than a rating and short review of the tent posted on the Acme website.

Figure 3:
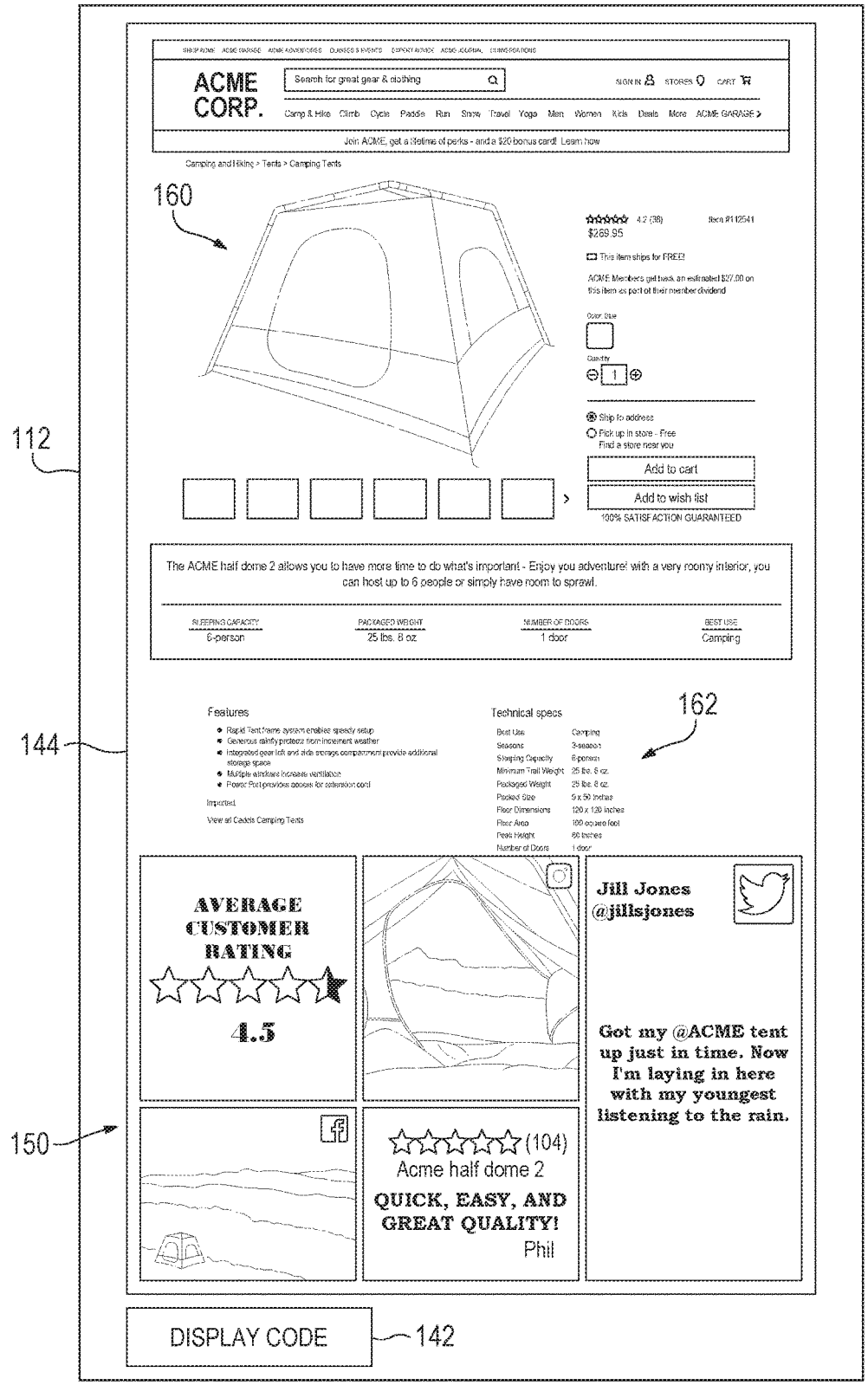
FIG. 3 depicts an example of how integrated rating and review data is displayed on a product webpage.

FIG. 3 shows another example of how RR system 100 integrates different rating and review data 150 into a company webpage 144. RR system 100 generates all of the integrated rating and review content 150 described above. RR system 100 also loads display code 142 onto Acme webpage 144.

Display code 142 displays rating and review content 150 below a picture 160 of the Acme tent and below other listed details and features 162 of the Acme tent provided on the Acme.com website. A potential buyer can view Acme supplied content 160 and 162 and also view third party content 150 provided by RR system 100 on the same Acme webpage 144.

This provides the customer with one location to view a wider variety of content regarding the displayed product, view an overall rating of the product generated from multiple different networks, and prevents the customer from having to manually search different social media websites for content discussing the Acme tent.

Figure 4:
FIG. 4 depicts another example of how integrated rating and review data is displayed next to a product.

FIG. 4 shows another example of how different rating and review data 150 is integrated on a same display device 170. In this example, display device 170 is located in a store next to a product 172. RR system 100 may only generate a subset of rating and review content 150 described above. For example, RR system 100 may generate an overall rating from both the structured and unstructured ratings associated with a particular brand of mayonnaise 172. In this example, RR system 100 also extracts a pull quote from social media posted on one of the social networks 112.

Display code (not shown) is loaded onto display device 170 and displays RR content 150. Any of the filters or rules described above can be used by a brand employee or a customer to display other ratings or reviews associated with product 172 posted on other networks 112.

Hardware and Software

Figure 5:
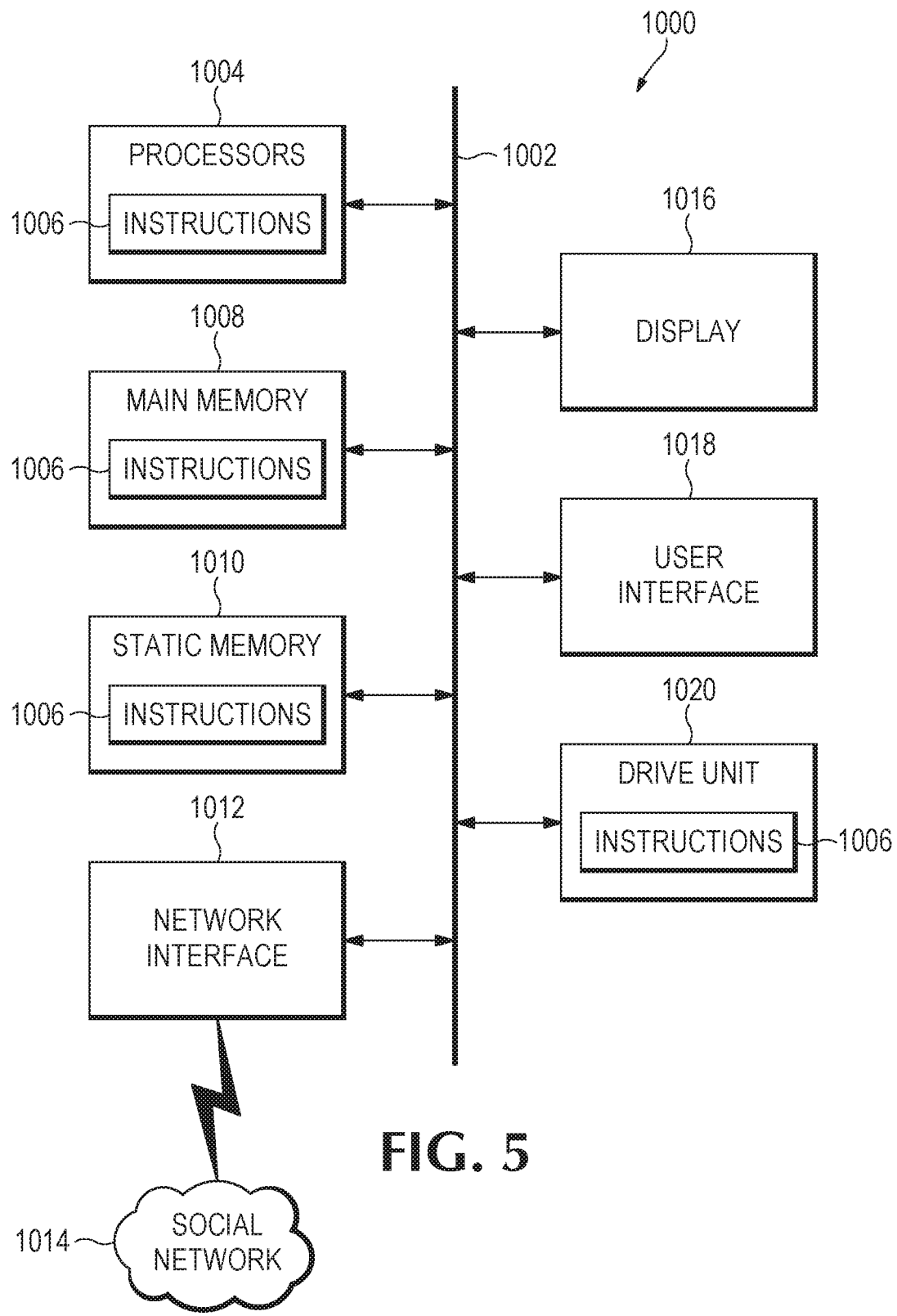
FIG. 5 depicts an example computer system for implementing the integrated rating and review system.

FIG. 5 shows a computing device 1000 that may be used for operating the RR system 100 and performing any combination of operations discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the same corresponding time period.

The invention claimed is:

1. A method of generating a normalized rating value from aggregated content generated using disparate computer data processing systems, wherein the aggregated content includes structured content from a first computer data processing system of the disparate computer data processing systems and unstructured content from a second different computer data processing system of the disparate computer data processing systems, the method comprising:
   extracting first topic data corresponding to a topic from the structured content and second topic data corresponding to the topic from the unstructured content;
   recognizing, in the first topic data, discrete values corresponding to a selected object, wherein the discrete values comprise ratings of the selected object;
   recognizing, in the second topic data, text strings about the selected object, wherein the text strings are from user messages, respectively, about the selected object;
   recognizing, in the second topic data, strings of non-text data in the user messages, respectively; and
   assigning a normalized rating value to each of the recognized text strings and each of the recognized strings of non-text data, wherein the normalized rating value is generated using the assigned normalized rating values and the discrete values;
   wherein the normalized ratings values for the recognized strings of non-text data are based on comparing icons or emojis in the recognized strings of non-text data to plural lists of icons or emojis, wherein ones of the normalized ratings values for those recognized strings of non-text data corresponding to a first list of the plural lists are in a first range of values, and wherein ones of the normalized ratings values for those recognized strings of non-text data corresponding to a second different list of the plural lists are in a second different range of values.

2. A memory storing instructions to generate a normalized rating value from structured content and unstructured content, wherein the instructions, when executed by a processor, cause the processor to:
   extract first topic data corresponding to a topic from the structured content and second topic data corresponding to the topic from the unstructured content;
   recognize, in the first topic data, discrete values corresponding to a selected object, wherein the discrete values comprise ratings of the selected object;
   recognize, in the second topic data, text strings about the selected object, wherein the text strings are from user messages of social media, respectively, about the selected object;
   recognize, in the second topic data, strings of non-text data in the user messages of the social media, respectively; and
   assign a normalized rating value to each of the recognized text strings and each of the recognized strings of non-text data, wherein the normalized rating value is generated using the assigned normalized rating values and the discrete values;
   wherein the normalized ratings values for the recognized strings of non-text data are based on counting discrete graphic images in the recognized strings of non-text data, respectively.

3. The memory of claim 2, wherein the normalized ratings values for the recognized strings of non-text data are based on comparing icons or emojis in the recognized strings of non-text data to reference icons or emojis, wherein ones of the normalized ratings values for those recognized strings of non-text data corresponding to a first icon or emoji of the reference icons or emojis are in a first range of values, and wherein ones of the normalized ratings values for those recognized strings of non-text data corresponding to a second different icon or emoji of the reference icons or emojis in a second different range of values.

4. The memory of claim 2, wherein the normalized ratings values for the recognized strings of non-text data are further based on counting icons or emojis per recognized string of non-text data.

5. The method of claim 1, wherein the assigned normalized rating values comprise first assigned normalized rating values, and further comprising assigning a second normalized rating value to each of the discrete values, wherein the normalized rating value is generated using the first assigned normalized rating values and the second assigned normalized values.

6. The method of claim 1, wherein the normalized rating values correspond to a range associated with the discrete values.

7. The method of claim 1, wherein the normalized ratings values for the recognized text strings are based on comparing keywords in the recognized text strings to reference keywords, wherein ones of the normalized ratings values for those recognized text strings corresponding to a first keywords of the reference keywords are in a first range of values, and wherein ones of the normalized ratings values for those recognized text strings corresponding to a second keywords of the reference keywords are in a second different range of values.

8. The method of claim 1, wherein the user messages comprises content of a social network.

9. The method of claim 1, wherein the user messages comprise video descriptions of videos uploaded to a video sharing website.

10. The method of claim 1, further comprising a user terminal to configure rules of a plurality of rules, wherein the method further comprises assigning the normalized rating value to the recognized text strings and the recognized strings based on the configured rules.

11. An apparatus to generate a normalized rating value from structured content and unstructured content, the apparatus comprising:
a memory having instructions stored thereon that, when executed by a processor, cause the processor to:
extract first topic data corresponding to a topic from the structured content and second topic data corresponding to the topic from the unstructured content;
recognize, in the first topic data, discrete values corresponding to a selected object, wherein the discrete values comprise ratings of the selected object;
recognize, in the second topic data, text strings about the selected object, wherein the text strings are from user messages, respectively, about the selected object;
recognize, in the second topic data, strings of non-text data in the user messages, respectively; and
assign a normalized rating value to each of the recognized text strings and each of the recognized strings of non-text data, wherein the normalized rating value is generated using the assigned normalized rating values and the discrete values;
wherein the normalized ratings values for the recognized strings of non-text data are based on comparing icons or emojis in the recognized strings of non-text data to reference icons or emojis, wherein ones of the normalized ratings values for those recognized strings of non-text data corresponding to a first icon or emoji of the reference icons or emojis are in a first range of values, and wherein ones of the normalized ratings values for those recognized strings of non-text data corresponding to a second different icon or emoji of the references icons or emojis are in a second different range of values.

12. The apparatus of claim 11, wherein the normalized ratings values for the recognized strings of non-text data are further based on counting discrete graphic images in the recognized strings of non-text data, respectively.

13. The apparatus of claim 11, wherein the normalized ratings values for the recognized strings of non-text data are further based on counting the icons or emojis per recognized string of non-text data.

14. The apparatus of claim 11, wherein the assigned normalized rating values comprise first assigned normalized rating values, and wherein the instructions, when executed by the processor, further cause the processor to assign a second normalized rating value to each of the discrete values, wherein the structured rating value is generated using the first assigned normalized rating values and the second assigned normalized values.

15. The apparatus of claim 11, wherein the normalized rating values correspond to a range associated with the discrete values.

16. The apparatus of claim 11, wherein the normalized ratings values for the recognized text strings are based on comparing keywords in the recognized text strings to reference keywords, wherein ones of the normalized ratings values for those recognized text strings corresponding to a first keyword of the reference keywords are in a first range of values, and wherein ones of the normalized ratings values for those recognized text strings corresponding to a second different keyword of the reference keywords are in a second different range of values.

17. The apparatus of claim 11, wherein the user messages comprises content of a social network.

18. The apparatus of claim 11, wherein the user messages comprise video descriptions of videos uploaded to a video sharing website.

19. The apparatus of claim 11, further comprising a user terminal to configure rules of a plurality of rules used, wherein the instructions, when executed by the processor, further cause the processor to assign the normalized rating value to the recognized text strings and the recognized strings of non-text data based on the configured rules.

20. The apparatus of claim 11, wherein the normalized ratings values for the recognized strings of non-text data are based on counting discrete graphic images in the recognized strings of non-text data, respectively.

\* \* \* \* \*